(12) United States Patent
Croizet-Berger et al.

(10) Patent No.: US 12,262,724 B2
(45) Date of Patent: Apr. 1, 2025

(54) POULTRY FEED AND DRINKING WATER COMPOSITION COMPRISING A STABLE, BIOAVAILABLE SILICON COMPLEX

(71) Applicant: SIL'INNOV SRCL, Courcelles (BE)

(72) Inventors: Karine Croizet-Berger, Court St. Etienne (BE); Ivan Coste-Maniere, Grasse (FR)

( * ) Notice: Subject to any disclaimer, the term of this patent is extended or adjusted under 35 U.S.C. 154(b) by 783 days.

(21) Appl. No.: 17/424,323

(22) PCT Filed: Jan. 24, 2019

(86) PCT No.: PCT/EP2019/051793
§ 371 (c)(1),
(2) Date: Jul. 20, 2021

(87) PCT Pub. No.: WO2020/151829
PCT Pub. Date: Jul. 30, 2020

(65) Prior Publication Data
US 2022/0151263 A1    May 19, 2022

(51) Int. Cl.
| | | |
|---|---|---|
| *A23K 20/28* | (2016.01) | |
| *A23K 20/111* | (2016.01) | |
| *A23K 50/75* | (2016.01) | |
| *A23L 29/00* | (2016.01) | |
| *A23L 33/16* | (2016.01) | |

(52) U.S. Cl.
CPC ............ *A23K 20/28* (2016.05); *A23K 20/111* (2016.05); *A23K 50/75* (2016.05); *A23L 29/015* (2016.08); *A23L 33/16* (2016.08); *A23V 2200/306* (2013.01); *A23V 2250/1628* (2013.01); *A23V 2250/2132* (2013.01)

(58) Field of Classification Search
CPC ......... A23K 20/28; A23K 50/75; A23L 33/16; A23L 29/015
See application file for complete search history.

(56) References Cited

U.S. PATENT DOCUMENTS
5,133,963 A    7/1992    Ise

FOREIGN PATENT DOCUMENTS
| | | |
|---|---|---|
| EP | 1371289 A1 | 12/2003 |
| EP | 2268161 A1 | 1/2011 |
| EP | 2526954 A1 | 11/2012 |
| WO | 2018155379 A1 | 8/2018 |
| WO | 2020151829 A1 | 7/2020 |

OTHER PUBLICATIONS

ISR-WO from parent application PCT/EP2019/051793 dated Oct. 18, 2019.

*Primary Examiner* — Jenna A Watts
(74) *Attorney, Agent, or Firm* — Vorys, Sater, Seymour and Pease, LLP

(57) ABSTRACT

The present invention provides a poultry feed or drinking water composition comprising a stable, bioavailable silicon complex formed between silicic acid having free hydroxyl groups and at least one stabilizing agent based on phenol or polyphenol; said poultry feed or drinking water composition for improving bone strength and a method of breeding poultry by feeding to said poultry a feed or drinking water composition comprising a stable, bioavailabie silicon complex formed between silicic add having free hydroxyl groups and at least one stabilizing agent based on phenol or polyphenol.

16 Claims, No Drawings

POULTRY FEED AND DRINKING WATER COMPOSITION COMPRISING A STABLE, BIOAVAILABLE SILICON COMPLEX

TECHNICAL FIELD

The present invention relates to poultry feed and drinking water composition, methods of breeding poultry by feeding liquid compositions and compounds for such uses.

More specifically, the present invention relates to the field of compounds and compositions for the improvement of growth profile of poultry in breeding farms, as well as the improvement of bone strength in poultry.

INTRODUCTION

Poultry farming is the process of raising domesticated birds such as chickens, ducks, turkeys and geese for the purpose of farming meat or eggs for food. Poultry—mostly chickens—are farmed in great numbers. Farmers raise more than 50 billion chickens annually as a source of food, both for their meat and for their eggs. Chickens raised for eggs are usually called layers while chickens raised for meat are often called broilers.

Meat chickens, commonly called broilers, are floor-raised on litter such as wood shavings, peanut shells, and rice hulls, indoors in climate-controlled housing. Under modern farming methods, meat chickens reared indoors reach slaughter weight at 5 to 9 weeks of age, as they have been selectively bred to do so. In the first week of a broiler's life, it can grow up to 300 percent of its body size. A nine-week-old broiler averages over 9 pounds in body weight.

Broilers are raised in large, open structures known as grow-out houses. A farmer receives the birds from the hatchery at one day old. A grow-out consists of 5 to 9 weeks according to how big the kill plant wants the chickens to be. These houses are equipped with mechanical systems to deliver feed and water to the birds. Chicken feed consists primarily of corn and soybean meal with the addition of essential vitamins and minerals. No hormones or steroids are allowed in raising chickens. Two kilograms of grain must be fed to poultry to produce 1 kg of weight gain, much less than that required for pork or beef. Because dry bedding helps maintain flock health, most grow-out houses have enclosed watering systems ("nipple drinkers") which reduce spillage.

Efficiency of farming of poultry, especially chickens, is of utmost importance, and is mainly achieved by feeding essential vitamins and minerals. EP 1 176 875 relates to the use of creatine or creatine salts as a fat substitute to be given to breeding animals and feeder animals. The creatine or creatine salts are used as a substitute for flesh meal, fish meal and/or antimicrobial performance enhancers, growth hormones as well as anabolic agents. EP0103206 relates to a feed composition containing a dithia derivative. It was made dear that, by adding the dithia derivative to a feed and administering the feed composition to livestock, poultry, fish, etc., fat deposit particularly abdominal fat can be reduced with the whole body weight not being reduced, namely, carcass effectiveness can be enhanced and further, in poultry such as chicken or quail, strength of eggshell can be increased. WO 2005/120246 relates to the use of guanidino acetic acid and/or the salts thereof as an animal food additive, wherein in predominantly vegetarian diets, salts with hydrochloric acid, hydrogen bromide acid and phosphoric acid are particularly used. The use thereof takes places, particularly, in individual doses of 0.01 to 100 g; kg of animal food in the form of powder, granulates, pellets or capsules, and the animal food additive can also be taken with other physiologically active valuable substances. EP 0 125 322 describes a process for the use of ergotropic agent combinations in the breeding and the fattening of poultry, pigs and cattle, whereby 6-methyluracil and N-guanidino-N'-thioureido-p-benzoquinone-diimide are used as agents, the combinations of both the said agents containing each individual agent in amounts of 2 to 100 ppm in the feed, the total quantity of both agents not exceeding 125 ppm. EP 0 585 514 describes an animal feed and an additive thereto or to drinking water containing an antibiotic combination of 1 part by weight of gentamicin and 5 to 60 parts by weight of lincomycin or clindamycin, preferably in the form of pharmacologically acceptable acid addition salts thereof, for the prophylaxis and the therapy of infections and, consequently, for the increase of the gain in body weight in fattening animals. For the increase of the gain in body weight in poultry, the combination of gentamicin sulfate and lincomycin hydrochloride is very effective. WO 96/08977 discloses an agent for increasing the production of/in breeding and production animals in the poultry industry, which agent consists of at least one type of zanthophylles, is described. The preferred xanthophyll is astaxanthin. Also, a method of increasing the production of/in breeding and production animals in the poultry industry by administering an agent which consists of at least one type of xanthophylles, preferably astaxanthin, in the feed to animals is disclosed.

Additionally the use of the agent, preferably astaxanthin, for increasing the production of/in breeding and production animals in the poultry industry by administering said agent in the feed to said animals is disclosed.

The present invention aims to provide new methods and compositions for breeding poultry which methods and compositions envision improved health and enhanced growth profile, as determined by enhanced weight profile.

SUMMARY OF THE INVENTION

The current invention provides in a solution for at least one of the above mentioned problems by providing a poultry feed and drinking water composition comprising a stable, bioavailable silicon complex.

In a first aspect, the present invention provides a poultry feed or drinking water composition comprising a stable, bioavailable silicon complex formed between silicic acid having free hydroxyl groups and at least one stabilizing agent based on phenol or polyphenol, stabilizing at least part of said free hydroxyl groups of silicic acid. The inventors have surprisingly found that feeding of said silicon complex induces an improved growth profile in the treated poultry.

In a second aspect, the present invention provides a poultry feed or drinking water composition according to the first aspect of the invention, for medical use, preferably for improving bone strength in poultry. The inventors have surprisingly found that in addition to improved weight gain, the treated poultry population shows improved bone strength.

In a third aspect, the present invention provides a method of breeding poultry by feeding to said poultry a feed or drinking water composition comprising a stable, bioavailable silicon complex formed between silicic acid having free hydroxyl groups and at least one stabilizing agent based on phenol or polyphenol, stabilizing at least part of said free hydroxyl groups of silicic acid. The inventors have surprisingly found that feeding of said silicon complex induces an improved growth profile in the treated poultry. This is observed by means of improved weight gain per day.

In a fourth aspect, the present invention provides in a use of a stable, bioavailable silicon complex formed between silicic acid having free hydroxyl groups and at least one stabilizing agent based oh phenol or polyphenol for breeding poultry.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints. All percentages are to be understood as percentage by weight and are abbreviated as "% wt.", unless otherwise defined or unless a different meaning is obvious to the person skilled in the art from its use and in the context wherein it is used.

The terms "additional therapeutically active compound" or "additional therapeutic agent", as used in the context of the present disclosure, refers to the use or administration of a compound for an additional therapeutic use for a particular injury, disease, or disorder being treated. Such a compound, for example, could include one being used to treat an unrelated disease or disorder.

As use herein, the terms "administration of" and or "administering" a compound should be understood to mean providing a compound of the disclosure or a prodrug of a compound of the disclosure to a subject in need of treatment.

The term "antimicrobial agents" as used herein refers to any naturally-occurring, synthetic, or semi-synthetic compound or composition or mixture thereof, which is safe for human or animal use as practiced in the methods described herein, and is effective in killing or substantially inhibiting the growth of microbes. "Antimicrobial" as used herein, includes antibacterial, antifungal, and antiviral agents.

The term "silicic acid" is to be understood as is the general name for a family of chemical compounds containing the element silicon attached to oxide and hydroxyl groups. This family of compounds has the general formula $[SiO_x(OH)_{4-2x}]_n$. Examples include metasilicic acid ($H_2SiO_3$), i.e. the chain or cyclic $[SiO(OH)_2]_n$, orthosilicic acid ($H_4SiO_4$, i.e. $Si(OH)_4$ with calculated $pK_{a1}$=9.84, $pK_{a2}$=13.2 at 25° C.), disilicic acid ($H_2Si_2O_5$), i.e. the polymer $[SiO_{1.5}(OH)]_n$, and pyrosilicic acid ($H_6Si_2O_7$), i.e. $O(Si(OH)_3)_2$. Preferably, said silicic acid is orthosilicic acid. The inventors have found that in the context of the present invention orthosilicic acid provides the best performance in the medical uses.

The term "improve," as used herein, refers to the ability of a compound, agent, or method to improve a condition, i.e. weight of poultry or bone strength, based on the context in which the term "improve" is used. Preferably, improvement is by at least 1%, more preferably by at least 2%, even more preferably by at least 5%, and most preferably, the condition is improved by at least 10%.

As used herein, "additional ingredients" include one or more of the following: excipients; surface active agents; dispersing agents; inert diluents; granulating and disintegrating agents; binding agents; lubricating agents; sweetening agents; flavouring agents; colouring agents; preservatives; physiologically degradable compositions such as gelatine; aqueous vehicles and solvents; oily vehicles and solvents; suspending agents; dispersing or wetting agents; emulsifying agents, demulcents; buffers; salts; thickening agents; fillers; emulsifying agents; antioxidants; antibiotics; antifungal agents; stabilizing agents; and pharmaceutically acceptable polymeric or hydrophobic materials. Other "additional ingredients" which may be included in the pharmaceutical compositions are known in the art and described, for example in Genaro, ed. (1985, Remington's Pharmaceutical Sciences, Mack Publishing Co., Easton, Pa.).

Other components such as preservatives, antioxidants, surfactants, absorption enhancers, viscosity enhancers or film forming polymers, bulking agents, diluents, flavouring agents, pH modifiers, sweeteners or taste-masking agents may also be incorporated into the composition. Suitable flavouring agents include mint, raspberry, licorice, orange, lemon, grapefruit, caramel, vanilla, cherry grape flavours and combinations thereof. Suitable pH modifiers include, but are not limited to, citric acid, tartaric acid, phosphoric acid, hydrochloric acid, maleic acid and sodium hydroxide. Suitable sweeteners include, but are not limited to, aspartame, acesulfame K and thaurnatin. Suitable taste-masking agents include, but are not limited to, sodium bicarbonate, vanilla, ion-exchange resins, cyclodextrin inclusion compounds and adsorbates.

Poultry Feed or Drinking Water Composition

In a first aspect, the present invention provides a poultry feed or drinking water composition comprising a stable, bioavailable silicon complex formed between silicic acid having free hydroxyl groups and at least one stabilizing agent based on phenol or polyphenol, stabilizing at least part of said free hydroxyl groups of silicic acid. Without being bound to any mechanistic studies, it is assumed that said silicic acid is stabilized by hydrogen bonding and optionally further interactions. The inventors have surprisingly found that feeding of said silicon complex induces an improved growth profile in the treated poultry. This is observed by means of improved weight gain per day. This means that i.e. chickens reach higher target weights for slaughter. Also, this means that i.e. chickens reach the expected weight for slaughter much earlier, i.e. after 40 days instead of 50 or even 60 days. Also, it was found that the weight growth of the poultry enhanced much faster compared to poultry which was not fed with the silicon complex composition of the invention.

In a preferred embodiment, the present invention provides a poultry drinking water composition according to the first aspect of the invention. A drinking water is preferred since a concentrated solution of the silicone complex can easily be added to a drinking water supply. The complex is easily and homogeneously mixed in a liquid, aqueous solution to the desired concentration, as outlined below.

In a preferred embodiment, the present invention provides a poultry feed or drinking water composition according to the first aspect of the invention, wherein said composition comprises silicon in an amount of at least 10 µg per kg of composition as determined by ICP-AES, preferably at least 20 µg per kg, at least 30 µg per kg, at least 40 µg per kg, at least 50 µg per kg, at least 60 µg per kg, at least 70 µg per kg, at least 80 µg per kg, at least 90 µg per kg, or even at least 100 µg per kg. Such minimal amount yield the preferred growth improvement in poultry. Preferably, said composition comprises silicon in an amount of at most 1.000.000 µg per kg of composition, preferably at most 1.000.000 µg per kg, at most 900.000 µg per kg, at most 800.000 µg per kg, at most 700.000 µg per kg, at most 600.000 µg per kg, at most 500.000 µg per kg, at most 400.000 µg per kg, at most 300.000 µg per kg, at most 200.000 µg per kg, or even at most 100.000 µg per kg of composition. Higher concentrations do not provide for further enhanced weight growth profiles, thus resulting in lower efficiency of the consumed silicon complex.

In a preferred embodiment, the present invention provides a poultry feed or drinking water composition according to the first aspect of the invention, wherein said composition comprises silicon in an amount of 100 µg per kg of composition to 100.000 µg per kg of composition as determined by ICP-AES. Preferably, said composition comprises silicon in an amount of at least 100 µg per kg of composition, at least 125 µg per kg, at least 150 µg per kg, at least 200 µg per kg, at least 250 µg per kg, at least 300 µg per kg, at least 350 µg per kg, at least 400 µg per kg, or even at least 500 µg per kg. Preferably, said composition comprises silicon in an amount of at most 100.000 µg per kg of composition, preferably at most 100.000 µg per kg, at most 90.000 µg per kg, at most 80.000 µg per kg, at most 70.000 µg per kg, at most 60.000 µg per kg, at most 50.000 µg per kg, at most 40.000 µg per kg, at most 30.000 µg per kg, at most 20.000 µg per kg, at most 10.000 µg per kg, at most 50.000 µg per kg of composition.

In a preferred embodiment, the present invention provides a poultry feed or drinking water composition according to the first aspect of the invention, wherein said composition comprises silicon in an amount of 500 µg per kg of composition to 2.500 µg per kg of composition as determined by ICP-AES. Preferred concentrations are 500 µg per kg composition, 600 µg per kg composition, 700 µg per kg composition, $00 µg per kg composition, 900 µg per kg composition, 1.000 µg per kg composition, 1.100 µg per kg composition, 1.200 µg per kg composition, 1.300 µg per kg composition, 1.400 µg per kg composition, 1.500 µg per kg composition, 1.600 µg per kg composition, 1.700 µg per kg composition, 1.800 µg per kg composition, 1.900 µg per kg composition, 2.000 µg per kg composition, 2.100 µg per kg composition, 2.200 µg per kg composition, 2.300 µg per kg composition, 2.400 µg per kg composition or 2.500 µg per kg composition, or any concentration there in between.

In a preferred embodiment, the present invention provides a poultry feed or drinking water composition according to the first aspect of the invention, wherein said silicic acid is orthosilicic acid having four free hydroxyl groups. The inventors have found that orthosilicic acid provides improved results. In this complex, the orthosilicic acid carries four free hydroxyl groups, which excludes any presence of organic radical and therefore of organosilanes. The orthosilicic acid is complexed with at least one phenolic or polyphenolic compound comprising at least one aromatic ring and one or more hydroxyl groups. Preferably it could further contain one or more carbonyl groups (C=O). The aromatic, and therefore stericaily hindered, structure of phenolic or polyphenolic compounds and the presence of hydroxyl and optionally carbonyl groups play a fundamental role in the stabilization process. Hydrogen bonds characteristic of weak electrostatic bonds are established between the hydroxyl groups of orthosilicic acid and the hydroxyl and carbonyl groups of the phenolic compounds. Although not being bound by any mechanistic theories, it is assumed that an esterification reaction between the orthosilicic acid and the phenolic compound (polyphenolic) is excluded. These bonds prevent the polymerization of orthosilicic acid and the formation of Si—O—Si bonds.

In a preferred embodiment, the present invention provides a poultry feed or drinking water composition according to the first aspect of the invention, wherein said stabilizing agent is selected from the group comprising phenolic acids, phenols, aldehyde derivatives of phenolic acids, cinnamic aldehydes, coumarins, naphthoquinones, flavonoids, stilbenes and mixtures of one or more of the aforementioned, preferably wherein said stabilizing agent is 4-hydroxy-3-methoxybenzaldehyde. The stabilizer is preferably a phenolic or polyphenolic compound and the following compounds, not limited thereto, may be exemplified: phenolic acids, such as 3-4-5-trihydroxybenzoic acid, 4-hydroxy-3-acid; methoxybenzoic acid, 3-4-dihydroxybenzoic acid, 4-hydroxy-3,5-dimethoxybenzoic acid, 2-hydroxybenzoic acid, 2-5-dihydroxybenzoic acid, 3-(4-hydroxyphenyl) acid 2-propenoic acid, 3-(3,4-dihydroxyphenyl) prop-2-enoic acid, 3-(4-hydroxy-3-methoxyphenyl) prop-2-enoic acid, 3-(4-hydroxy-3,5-dimethoxyphenyl)-prop-2-mono acid, (R)-a-[[3-(3,4-dihydroxyphenyl)-1-oxo-2E-propenyl]-oxy]-3,4-dihydroxybenzenepropanoic acid, etc.; simple phenols, such as benzene-1,2-diol, benzene-1,3-diol, 2-isopropyl-5-methylphenol; phenylbutanone, such as 1-(4-hydroxyphenyl) -3-butanone; aldehyde derivatives of phenolic acids, such as 4-hydroxy-3-methoxybenzaldehyde, etc.; cinnamic aldehydes, such as 4-allyl-2-methoxyphenol, 2-methoxy-4-propenylphenol, etc.; coumarins, such as 7-hydroxy-chromen-2-one, 5,7-dihydroxychromen-2-one, etc.; naphthoquinones, such as 5-hydroxy-1,4-naphthoquinone, etc.; flavonoids, such as catechin (2-(3,4-dihydroxyphenyl) chroman-3,5,7-triol) and epicatechin (EC), epigallocatechin (EGC), epicatechin gallate (ECG), epigallocatechin gallate (EGCG), kaempferol, quercetol, luteolin, etc.; stilbenes, such as resveratrol, pinosylvin, piceatannol, pterostilbene, etc. Preferred stabilizers are 4-hydroxy-3-methoxybenzaldehyde, 1-(4-hydroxyphenyl)-3-butanone, 2-hydroxybenzoic acid, and (2-(3,4-dihydroxyphenyl)-chromane-3,5,7-triol). In a more preferred embodiment, the present invention provides a composition according to the first aspect of the invention, wherein said stabilizing agent is 4-hydroxy-3-methoxybenzaldehyde.

In a preferred embodiment, the present invention provides a poultry feed or drinking water composition according to the first aspect of the invention, further comprising one or more therapeutic agents, preferably selected from the group consisting of vitamins, antimicrobial agents, disinfectants, fungicides, anti-inflammatories, plant extracts, antibacterial agents, antifungal agents, antiviral agents, antibiotics.

Poultry Feed or Drinking Water Compositions for Medical Use

In a second aspect, the present invention provides a poultry feed or drinking water composition according to the first aspect of the invention, for medical use, preferably for improving bone strength in poultry. The inventors have surprisingly found that in addition to improved weight gain, the treated poultry population shows improved bone strength. This is advantageous to prevent breaking of the legs due to the enhanced weight.

In a preferred embodiment, the present invention provides a poultry feed or drinking water composition according to the second aspect of the invention, whereby said poultry is chicken. Preferably, said chicken is between 1 and 60 days of age, preferably between 1 and 40 days.

Preferred Compositions

In a preferred embodiment, the present invention provides a composition according to the first or second aspect of the invention, whereby said composition is a drinking water composition and whereby said composition has a pH of less than 6, preferably less than 4, and equal to or greater than 2, preferably of between 2.5 and 3.5; and a Si content of between 300 ppm and 1400 ppm by weight per volume of the composition and a ratio between the content of Si (wt./vol.-% of said composition) and the content of stabilizing agent (wt./vol.-% of said composition) of between 0.1 and 1. Preferably, said composition has a Si content between 0.4 ppm and 1.2 ppm by weight per volume of preparation, more preferably between 0.5 ppm and 1.1 ppm by weight per volume of preparation, even more preferably between 0.6 ppm and 1.0 porn by weight per volume of preparation and most preferably between 0.7 ppm and 0,9 ppm by weight per volume of preparation. The Si content of the preparation and the ratio % of Si (wt,/vol.)-% of stabilizing agent (wt./vol.) indicated above must be respected for the preparation to contain enough bioavailable silicon complex and this without risk of polycondensation. More preferably, the ratio of Si (wt./vol.)-% of stabilizing agent (wt./vol.) is between 0.5 and 0.9, in particular between 0.6 and 0.8.

In a preferred embodiment, the present invention provides a composition according to the first or the second aspect of the invention, further comprising one or more therapeutic agents. Preferably, said additional therapeutic agent is selected from the group consisting of vitamins, antimicrobial agents, disinfectants, fungicides, anti-inflammatories, wound care products, wound healing agents, plant extracts, animal extracts, cell extracts, antibacterial agents, antifungal agents, antiviral agents, antibiotics. Several preferred embodiments include use of any therapeutic molecule including any pharmaceutical or drug. Examples of pharmaceuticals include sedatives and sleep inducers, antiallergics, antiarthritics, appetite suppressants, muscle relaxants, vitamins, antimicrobial agents, antacids, antiseptics, diuretics, disinfectants, fungicides, ectoparasiticides, antiparasitics, antioxidants, vitamins, cosmetics, anti-inflamrnatories, wound care products, wound healing agents, plant extracts, emollients, antibacterial agents, antifungal agents, antiviral agents, antibiotics. A list of the types of drugs, and specific drugs within categories which are encompassed within the invention is provided below and are intended be non-limiting examples. Antimicrobial agents include: silver suifadiazine, Nystatin, Nystatin/triamcinolone, Bacitracin, nitrofurazone, nitrofurantoin, a polymyxin (e.g., Colistin, Surfactin, Polymyxin E, and Polymyxin B), doxycycline, antimicrobial peptides (e.g., natural and synthetic origin), Neosporin (i.e., Bacitracin, Polymyxin B, and Neomycin), Polysporin (i.e., Bacitracin and Polymyxin B). Additional antimicrobials include topical antimicrobials (i.e., antiseptics), examples of which include silver salts, iodine, benzalkonium chloride, alcohol, hydrogen peroxide, and chlomexidine. Anti-inflammatory: Alclofenac; Alclometasone Dipropionate; Aigestone Acetonide; Alpha Amylase; Amcinafal; Amcinafide; Amfenac Sodium; Amiprilose Hydrochloride; Anakinra; Anirolac; Anitrazafen; Apazone; Balsalazide Disodium; Bendazac; Benoxaprofen; Benzydamine Hydrochloride; Bromelains; Broperamole; Budesonide; Carprofen; Cicloprofen; Cintazone; Cliprofen; Clobetasol Propionate; Clobetasone Butyrate; Clopirac; Cioticasone Propionate; Cormethasone Acetate; Cortodoxone; Deflazacort; Desonide; Desoximetasone; Dexamethasone Dipropionate; Diclofenac Potassium; Diclofenac Sodium; Diflorasone Diacetate; Diflumidone Sodium; Diflunisal; Difluprednate; Diftaione; Dimethyl Sulfoxide; Drocinonide; Endrysone; Enlimomab; Enolicam Sodium; Epirizole; Etodolac; Etofenaniate; Felbinac; Fenamole; Fenbufen; Fenclofenac; Fenciorac; Fendosal; Fenpipalone; Fentiazac; Flazaione; Fluazacort; Flufenamic Acid; Fiumizole; Flunisolide Acetate; Flunixin; Flunixin Meglumine; Fluocortin Butyl; Fluorometholone Acetate; Fluquazone; Flurbiprofen; Fluretofen; Fluticasone Propionate; Furaprofen; Furobufen; Halcinonide; Halobetasol Propionate; Halopredone Acetate; Ibufenac; Ibuprofen; Ibuprofen Aluminum; Ibuprofen Piconol; Ilonidap; indomethacin; Indomethacin Sodium; indoprofen; Indoxole; Intrazole; Isoflupredone Acetate; Isoxepac; Isoxicam; Ketoprofen; Lofemizole Hydrochloride; Lornoxicam; Loteprednol Etabonate; Meclofenamate Sodium; Meclofenamic Acid; Meclorisone Dibutyrate; Mefenamic Acid; Mesalamine; Meseclazone; Methylprednisolone Suleptanate; Momiflumate; Nabumetone; Naproxen; Naproxen Sodium; Naproxol; Nimazone; Olsalazine Sodium; Orgotein; Orpanoxin; Oxaprozin; Oxyphenbutazone; Paranyline Hydrochloride; Pentosan Polysulfate Sodium; Phenbutazone Sodium Glycerate; Pirfenidone; Piroxicam; Piroxicam Cinnamate; Piroxicam Olantine; Pirprofen; Prednazate; Prifelone; Prodolic Acid; Proquazone; Proxazole; Proxazole Citrate; Rimexolone; Romazarit; Salcolex; Salnacedin; Salsalate; Sanguinarium Chloride; Seclazone; Sermetacin; Sudoxicam; Sulindac; Suprofen; Talmetacin; Talniflumate; Talosalate; Tebufelone; Tenidap; Tenidap Sodium; Tenoxicam; Tesicam; Tesimide; Tetrydamine; Tiopinac; Tixocortol Pivalate; Tolmetin; Tolmetin Sodium; Triclonide; Triflumidate; Zidometacin; Zomepirac Sodium.

Suitable solvents for the composition according to the first or second aspect of the invention, may be selected from water, aliphatic and aromatic alcohols, sulfoxides, fatty acids, fatty acid esters, polyols, amides, surfactants, terpenes, alkanones, organic acids and mixtures thereof. Suitable alcohols include, without limitation, ethanol, propanol, butanol, pentanol, hexanol, octanol, nonanol, decanol, 2-butanol, 2-pentanol, benzyl alcohol, phenoxyethanoi, caprylic alcohol, decyl alcohol, lauryl alcohol, 2-lauryl alcohol, myristyl alcohol, cetyl alcohol, stearyl alcohol, oleyl alcohol, linolyl alcohol, linolenyl alcohol and mixtures thereof. Volatile aliphatic alcohols having 2 to about 8 carbon atoms, preferably 2 to about 5 carbon atoms, can provide a dual function of serving both as volatile carrier and penetration enhancer. The aromatic alcohols, such as benzyl alcohol, phenoxyethanol, and the like can provide a dual function of serving both as a substantially non-volatile, permeation enhancer and auxiliary anti-infective. Preferred alcohols are ethanol and benzyl alcohol. Suitable sulfoxides include dimethylsulfoxide, decylmethylsulfoxide, and mixtures thereof. Suitable fatty acids include valeric, heptanoic, pelargonic, caproic, capric, lauric, myristic, stearic, oleic, linoleic, linolenic, caprylic, isovaleric, neopentanoic, neoheptanoic, neononanoic, trimethyl hexanoic, neodecanoic and isostearic acids, and mixtures thereof. Suitable fatty acid esters include isopropyl n-butyrate, isopropyl n-hexanoate, isopropyl n-decanoate, isopropyl myristate, isopropyl palmitate, octyldodecyl myristate, ethyl acetate, butyl acetate, methyl acetate, methylvalerate, methylpropionate, diethyl sebacate, ethyl oleate, ethyl laurate and mixtures thereof. Suitable polyols include propylene glycol, polyethylene glycol, ethylene glycol, diethylene glycol, triethylene glycol, dipropylene glycol, glycerol, propanediol, sorbitol, dextrans, butanediol, pentanediol, hexanetriol, and mixtures thereof. Suitable amides include urea, dimethylacetamide, diethyltoluamide, dimethylformamide, dimethyloctamide, dimethyldecamide, pyrrolidone derivatives, 1-alkyl-4-imidazolin-2-one, cyclic amides, hexamethylenelauramide and its derivatives, diethanolamine, triethanolamine and mixtures thereof. Suitable pyrrolidone derivatives includel-methyl-2-pyrrolidone, 2-pyrrolidone, 1-lauryl-2-pyrrolidone, 1-lauryl-4-carboxy-2-pyrrolidone, 1-methyl-4-carboxy-2-pyrrolidone, 1-hexyl-4-carboxy-2-pyrrolidone, 1-decylthioethyl-2-pyrrolidone, N-cyclohexyl-pyrrolidone, 1-methyl-4-methoxycarbonyl-2-pyrrolidone, 1-hexyl-4-methoxy-carbonyl-2-pyrrolidone, 1-lauryl-4-methoxycarbonyl-2-pyrrolidone, N-dimethylamino-propyl-pyrrolidone, N-cocoylpyrrolidone, N-tallowylpyrrolidone, fatty acid esters of N-(2-hydroxymethyl)-2-pyrrolidone, and mixtures thereof. Suitable cyclic amides include, 1-dodecylazacycloheptan-2-one, 1-geranylazacycloheptan-2-one, 1-farnesylazacycloheptan-2-one, 1-geranyl-geranyl-azacycloheptan-2-one, 1-(3,7-dimethyloctyl) azacycloheptan-2-one, 1-(3,7,11-trimethyl-octyl) azacycloheptan-2-one, 1-geranylazacyclonexan-2-one, 1-geranyl-azacyclopentan-2,5-dione, 1-farnesylazacyclopentan-2-one, and mixtures thereof.

Suitable surfactants include anionic surfactants, cationic surfactants, nonionic surfactants, amphoteric surfactants and lecithin. Suitable anionic surfactants include sodium laurate, sodium lauryl sulfate, and mixtures thereof. Suitable cationic surfactants include cetyltrimethylammonium bromide, tetradecyltrimethyl ammonium bromide, benzalkonium chloride, octadecyltrimethyl ammonium chloride, cetylpyridinium chloride, dodecyltrimethylammonium chloride, hexadecyltrimethylammonium chloride, and mixtures thereof. Suitable nonionic surfactants include alpha-hydro-(D-hydroxy poly(oxyethylene)-poly(oxypropyl) poly(oxyethylene) block copolymers, polyoxyethylene ethers, polyoxyethylene sorbitan esters, polyethylene glycol esters of fatty alcohols, and mixtures thereof, Suitable alpha-hydro-co-hydroxy-poly(oxyethylene)-poly(oxypropyl) poly (oxyethylene) block copolymers include Poloxamers 182, 184, 231, and mixtures thereof. Suitable polyethylene glycol esters of fatty acids include polyoxyethylene, polyoxyethylene monostearate, the polyoxyethylene monostearate and mixtures thereof. Suitable amphoteric surfactants include, without limitation thereto, lauramidopropyl betaine, cocamidopropyl betaine, lauryl betaine, cocobetaine, cocamidopropyl-hydroxy-sultaine, aminopropyl laurylglutamide, sodium cocoaniphoacetate, sodium lauro-awhoacetate, disodium lauroamphodiacetate, disodium cocoamphodiacetate, sodium-cocoamphopropionate, disodium lauroamphodipropionate, disodium cocoampho-dipropionate, sodium-lauriminodipropionate, disodium-cocoampho-carboxy-methyl-hydroxy-propylsulfate, and the like. Suitable terpenes include D-limonene, α-pinene, β-enrene, α-terpineol, terpinen-4-ol, carvol, carvone, pulegone, piperitone, menthon, menthol, geraniol, cyclohexene oxide, limonene oxide, α-pinne oxide, cyclopentene oxide, 1,8-cineol, ylang ylang oil, anise oil, chenopodium oil, eucalyptus oil, and mixtures thereof. Suitable alkanones include N-heptane, N-octane, N-nonane, N-decane, N-undecane, N-dodecane, N-tridecane, N-tetradecane, N-hexadecane, and mixtures thereof. Suitable organic acids include citric acid, succinic acid, salicylic acid, salicylates (including the methyl, ethyl and propyl glycol derivatives), tartaric acid, and mixtures thereof.

Method for Breeding Poultry

In a third aspect, the present invention provides a method of breeding poultry by feeding to said poultry a feed or drinking water composition comprising a stable, bioavailable silicon complex formed between silicic acid having free hydroxyl groups and at least one stabilizing agent based on phenol or polyphenol, stabilizing at least part of said free hydroxyl groups of silicic acid. Without being bound to any mechanistic studies, it is assumed that said silicic acid is stabilized by hydrogen bonding and optionally further interactions. The inventors have surprisingly found that feeding of said silicon complex induces an improved growth profile in the treated poultry. This is observed by means of improved weight gain per day. This means that i.e. chickens reach higher target weights for slaughter. Also, this means that i.e. chickens reach the expected weight for slaughter much earlier, i.e. after 40 days instead of 50 or even 60 days. Also, it was found that the weight growth of the poultry enhanced much faster compared to poultry which was not fed with the silicon complex composition of the invention.

In a preferred embodiment, the present invention provides method according to the third aspect of the invention, wherein said silicon complex is comprised in drinking water. A drinking water is preferred since a concentrated solution of the silicone complex can easily be added to a drinking water supply. The complex is easily and homogeneously mixed in a liquid, aqueous solution to the desired concentration, as outlined below.

In a preferred embodiment, the present invention provides method according to the third aspect of the invention, wherein said composition comprises silicon in an amount of at least 10 µg per kg of composition per kg of composition as determined by ICP-AES, preferably at least 20 µg per kg, at least 30 µg per kg, at least 40 µg per kg, at least 50 µg per kg, at least 60 µg per kg, at least 70 µg per kg, at least 80 µg per kg, at least 90 µg per kg, or even at least 100 µg per kg. Such minimal amounts yield the preferred growth improvement in poultry. Preferably, said composition comprises silicon in an amount of at most 1.000.000 µg per kg of composition, preferably at most 1.000,000 µg per kg, at most 900.000 µg per kg, at most 800.000 µg per kg, at most 700.000 µg per kg, at most 600.000 µg per kg, at most 500.000 µg per kg, at most 400.000 µg per kg, at most 300.000 µg per kg, at most 200.000 µg per kg, or even at most 100.000 µg per kg of composition. Higher concentrations do not provide for further enhanced weight growth profiles, thus resulting in lower efficiency of the consumed silicon complex.

In a preferred embodiment, the present invention provides method according to the third aspect of the invention, wherein said composition comprises silicon in an amount of 100 µg per kg of composition to 100.000 µg per kg of composition as determined by ICP-AES. Preferably, said composition comprises silicon in an amount of at least 100 µg per kg of composition, at least 125 µg per kg, at least 150

µg per kg, at least 200 µg per kg, at least 250 µg per kg, at least 300 µg per kg, at least 350 µg per kg, at least 400 µg per kg, or even at least 500 µg per kg. Preferably, said composition comprises silicon in an amount of at most 100.000 µg per kg of composition, preferably at most 100.000 µg per kg, at most 90.000 µg per kg, at most 80.000 µg per kg, at most 70.000 µg per kg, at most 60.000 µg per kg, at most 50.000 µg per kg, at most 40.000 µg per kg, at most 30.000 µg per kg, at most 20.000 µg per kg, at most 10,000 µg per kg, at most 50.000 µg per kg of composition.

In a preferred embodiment, the present invention provides method according to the third aspect of the invention, wherein said composition comprises silicon in an amount of 500 µg per kg of composition to 2.500 µg per kg of composition as determined by ICP-AES. Preferred concentrations are 500 µg per kg composition, 600 µg per kg composition, 700 µg per kg composition, 800 µg per kg composition, 900 µg per kg composition, 1.000 µg per kg composition, 1.100 µg per kg composition, 1.200 µg per kg composition, 1.300 µg per kg composition, 1.400 µg per kg composition, 1.500 µg per kg composition, 1.600 µg per kg composition, 1.700 µg per kg composition, 1.800 µg per kg composition, 1.900 µg per kg composition, 2.000 µg per kg composition, 2.100 µg per kg composition, 2.200 µg per kg composition, 2.300 µg per kg composition, 2.400 µg per kg composition or 2.500 µg per kg composition, or any concentration there in between.

In a preferred embodiment, the present invention provides method according to the third aspect of the invention, wherein said poultry is chicken and wherein said chicken is between 1 and 60 days of age, preferably between 1 and 40 days.

In a preferred embodiment, the present invention provides method according to the third aspect of the invention, wherein said silicic acid is orthosilicic acid having four free hydroxyl groups. In a preferred embodiment, the present invention provides method according to the third aspect of the invention, wherein said stabilizing agent is selected from the group comprising phenolic acids, phenols, aldehyde derivatives of phenolic acids, cinnamic aldehydes, coumarins, naphthoquinones, flavonoids, stilbenes and mixtures of one or more of the aforementioned, preferably wherein said stabilizing agent is 4-hydroxy-3-methoxybenzaldehyde. In a preferred embodiment, the present invention provides method according to the third aspect of the invention, further comprising the step of feeding one or more therapeutic agents, preferably selected from the group consisting of vitamins, antimicrobial agents, disinfectants, fungicides, anti-inflammatories, plant extracts, antibacterial agents, antifungal agents, antiviral agents, antibiotics.

Use

In a fourth aspect, the present invention provides in a use of a stable, bioavailable silicon complex formed between silicic acid having free hydroxyl groups and at least one stabilizing agent based on phenol or polyphenol for breeding poultry.

EXAMPLES

In the following examples are intended to further clarify the present invention, and are nowhere intended to limit the scope of the present invention.

Example 1

Poultry Drinking Water Comprising Stabilized Complex of Orthosilicic Acid and 4-Hydroxy-3-Methoxybenzaldehyde (Vanillin)

Extra pure vanillin with purity guaranteed to 99.9% is used. The alternatives "Fine Mesh" or "Free flow" Will be preferred. 76 g of vanillin powder is dissolved with stirring at 40° C. in 100 ml of 40% ethanol. The homogeneous mixture obtained is diluted slowly with osmosis demineralized water so that the final volume ratio of the solution per volume of sodium orthosilicate introduced is equal to 225. The pH is then adjusted between 1.5 and 2.5 with a solution of phosphoric acid 14.5 N. Sodium orthosilicate (428 g, density: 1.35) is then added to the mixture, dropwise, with stirring. The solution is kept under constant stirring. Upon addition of the sodium orthosilicate, the temperature is maintained in a range of 10 to 15° C. The pH is adjusted between 2.5 and 3.5 with 30% (w/w) phosphoric acid solution, upon which the solution is diluted by adding 999 L of water per 1 L of solution. The resulting solution is dear and colourless. It has a Si content of 860 mg/L and a % Si (w/v)/% vanillin (w/v) ratio of 0.8.

The solution is fed as a drinking water solution to chickens over a period of day 1 to day 40 in regular feeding amounts. The chickens exhibited an improved growth rate as of about an additional growth of 100 grams of weight per day, when compared to a control population of chickens fed without the silicon complex according to the invention. As a further beneficial effect, chicken bone strength was significantly improved.

Example 2

Poultry Drinking Water Comprising Stabilized Complex of Orthosilicic Acid and 1-(4-hydroxyphenyl)-3-butanone (Frambinone)

410 g of frambinone are dissolved with stirring at 40° C. in 467 g of 40% ethanol. When the solution containing the phenolic compound is clear, it is diluted in an aqueous phase representing 223 times the volume of the precursor. The solution is then acidified using an 85 wt. % solution of phosphoric acid to reach a pH of between 1.5 and 2.5. 1794 g of potassium metasilicate (density: 1.35) are then added to the mixture, dropwise, with stirring. The solution is stirred until complete hydrolysis of the precursor. Upon addition of the potassium metasilicate, the temperature is maintained in a range of 10 to 15° C. The pH is controlled and, if necessary, adjusted between 2.5 and 3.5, upon which the solution is diluted by adding 999 L of water per 1 L of solution. The resulting solution is translucent and colourless. It has a Si content of 270 mg/L and a % Si (w/v)/% stabilizer (w/v) ratio of 0.2.

The solution is fed as a drinking water solution to chickens over a period of 1 to 40 days in regular feeding amounts. The chickens exhibited an improved growth rate as of about an additional growth of more than 50 grams of weight per day, when compared to a control population of chickens fed without the silicon complex according to the invention. As a further beneficial effect, chicken bone strength was significantly improved.

Example 3

Poultry Drinking Water Comprising Stabilized Complex of Orthosilicic Acid and 2-Hydroxybenzoic Acid 1.1 mole of a crystalline powder of 2-hydroxybenzoic acid is dissolved with stirring at 40° C. in 200 g of 40% ethanol. After solubilization of the phenolic compound, osmosis water is added slowly, with stirring, so that the ratio of final volume/volume of introduced precursor is equal to 225. The pH is adjusted between 1.5 and 2.5 with a solution of phosphoric acid 14.5 N. 4.5 moles of potassium orthosilicate are then added to the mixture, dropwise, with stirring. The hydrolysis process begins. Upon addition of the silicon compound, the temperature is maintained in a range of 10 to 15° C. The pH is adjusted between 2.5 and 3.5, upon which the solution is diluted by adding 999 L of water per 1 L of solution. The solution has a Si content of 660 mg/L and a % Si (w/v) 1% stabilizer (w/v) ratio of 0.9.

The solution is fed as a drinking water solution to chickens over a period of day 1 to day 40 in regular feeding amounts. The chickens exhibited an improved growth rate as of about an additional growth of about 100 grams of weight per day, when compared to a control population of chickens fed without the silicon complex according to the invention. As a further beneficial effect, chicken bone strength was significantly improved.

Example 4

Poultry Drinking Water Comprising Stabilized Complex of Orthosilicic Acid and (( )-2-(3,4-Dihydroxyphenyl) Chromane-3,5,7-Triol) (Catechin)

30.83 g of catechin are dissolved with stirring at 40° C. in 288 ml of 40% ethanol. A volume of osmosis water representing 225 times the volume of the precursor is then slowly added to the solution and the pH is adjusted between 1.5 and 2.5 with a solution of phosphoric acid 14.5 N. 56 g of metasilicate of sodium are then added to the mixture, dropwise, with stirring. When adding the sodium metasilicate, the temperature is maintained in a range of 10 to 15° C. The pH is controlled and, if necessary, adjusted between 2.5 and 3.5, upon which the solution is diluted by adding 999 L of water per 1 L of solution. The obtained solution has a Si content of 1370 mg/L and a % Si (w/v)/% stabilizer (w/v) ratio of 0.4.

The solution is fed as a drinking water solution to chickens over a period of day 1 to day 40 in regular feeding amounts. The chickens exhibited an improved growth rate as of about an additional growth of about 100 grams of weight per day, when compared to a control population of chickens fed without the silicon complex according to the invention. As a further beneficial effect, chicken bone strength was significantly improved.

Example 5

Poultry Drinking Water Comprising Stabilized Complex of Orthosilicic Acid and (( )-2-(3,4-Dihydroxyphenyl) Chroman-3,5,7-Triol)

30.83 g of catechin are dissolved with stirring at 40° C. in 288 ml of 40% ethanol. Osmosis water is then slowly added to the solution, so that the ratio of final volume/volume of introduced precursor is equal to 225, then the pH is adjusted between 1.5 and 2.5 with a solution of phosphoric acid 14.5 N, 96 g of tetraethoxysilane (density: 0.93) are then added to the mixture, dropwise, with stirring. Upon addition of the tetraethoxysilane, the temperature is maintained in a range of 15 to 18° C. The pH is controlled and, if necessary, adjusted between 2.7 and 3.0, upon which the solution is diluted by adding 999 L of water per 1 L of solution. The obtained solution has a Si content of 550 mg/L and a % Si (w/v) stabilizer (w/v) ratio of 0.4.

The solution is fed as a drinking water solution to chickens over a period of day 1 to day 40 in regular feeding amounts. The chickens exhibited an improved growth rate as of about an additional growth of about 100 grams of weight per day, when compared to a control population of chickens fed without the silicon complex according to the invention. As a further beneficial effect, chicken bone strength was significantly improved.

Example 6

Poultry Feed Comprising Stabilized Complex of Orthosilicic Acid and 4-Hydroxy-3-Methoxybenzaldehyde (Vanillin)

Extra pure vanillin with purity guaranteed to 99.9% is used, The alternatives "Fine Mesh" or "Free flow" will be preferred. 76 g of vanillin powder is dissolved with stirring at 40° C. in 100 ml of 40% ethanol. The homogeneous mixture obtained is diluted slowly with osmosis demineralized water so that the final volume ratio of the solution per volume of sodium orthosilicate introduced is equal to 225. The pH is then adjusted between 1.5 and 2.5 with a solution of phosphoric acid 14.5 N. Sodium orthosilicate (428 g, density: 1.35) is then added to the mixture, dropwise, with stirring. The solution is kept under constant stirring. Upon addition of the sodium orthosilicate, the temperature is maintained in a range of 10 to 15° C. The pH is adjusted between 2.5 and 3.5 with 30% (w/w) phosphoric acid solution. The resulting solution is clear and colourless. It has a Si content of 860 mg/L and a % Si (w/v)/% vanillin (w/v) ratio of 0.8.

The solution is then sprayed onto 1000 kg of corn and soybean meal and the mixture is homogenized. The poultry feed is fed to chickens over a period of day 1 to day 40 in regular feeding amounts. The chickens exhibited an improved growth rate as of about an additional growth of 100 grams of weight per day, when compared to a control population of chickens fed without the silicon complex according to the invention. As a further beneficial effect, chicken bone strength was significantly improved.

Example 7

Poultry Feed Comprising Stabilized Complex of Orthosilicic Acid and 1-(4-hydroxyphenyl)-3-butanone (Frambinone)

410 g of frambinone are dissolved with stirring at 40° C. in 467 g of 40% ethanol. When the solution containing the phenolic compound is clear, it is diluted in an aqueous phase representing 223 times the volume of the precursor. The solution is then acidified using an 85 wt. % solution of phosphoric acid to reach a pH of between 1.5 and 2.5, 1794 g of potassium metasilicate (density: 1.35) are then added to the mixture, dropwise, with stirring. The solution is stirred until complete hydrolysis of the precursor. Upon addition of the potassium metasilicate, the temperature is maintained in a range of 10 to 15° C. The pH is controlled and, if necessary, adjusted between 2.5 and 3.5. The resulting solution is translucent and colourless. It has a Si content of 270 mg/L and a % Si (w/v)/% stabilizer (w/v) ratio of 0.2.

The solution is then sprayed onto 1000 kg of corn and soybean meal and the mixture is homogenized. The poultry feed is fed to chickens over a period of day 1 to day 40 in regular feeding amounts. The chickens exhibited an improved growth rate as of about an additional growth of more than 50 grams of weight per day, when compared to a control population of chickens fed without the silicon complex according to the invention. As a further beneficial effect, chicken bone strength was significantly improved.

Example 8

Poultry Feed Comprising Stabilized Complex of Orthosilicic Acid and 2-Hydroxybenzoic Acid 1.1 mole of a crystalline powder of 2-hydroxybenzoic acid is dissolved with stirring at 40° C. in 200 g of 40% ethanol. After solubilization of the phenolic compound, osmosis water is added slowly, with stirring, so that the ratio of final volume/volume of introduced precursor is equal to 225. The pH is adjusted between 1.5 and 2.5 with a solution of phosphoric acid 14.5 N. 4.5 moles of potassium orthosilicate are then added to the mixture, dropwise, with stirring. The hydrolysis process begins. Upon addition of the silicon compound, the temperature is maintained in a range of 10 to 15° C. The pH is adjusted between 2.5 and 3.5. The solution has a Si content of 660 mg/L and a % Si (w/v) % stabilizer (w/v) ratio of 0.9.

The solution is then sprayed onto 1000 kg of corn and soybean meal and the mixture is homogenized. The poultry feed is fed to chickens over a period of day 1 to day 40 in regular feeding amounts. The chickens exhibited an improved growth rate as of about an additional growth of about 100 grams of weight per day, when compared to a control population of chickens fed without the silicon complex according to the invention. As a further beneficial effect, chicken bone strength was significantly improved.

Example 9

Poultry Feed Comprising Stabilized Complex of Orthosilicic Acid and (( )-2-(3,4-Dihydroxyphenyl) Chromane-3,5,7-Triol) (Catechin)

30.83 g of catechin are dissolved with stirring at 40° C. in 288 ml of 40% ethanol. A volume of osmosis water representing 225 times the volume of the precursor is then slowly added to the solution and the pH is adjusted between 1.5 and 2.5 with a solution of phosphoric acid 14.5 N. 56 g of metasilicate of sodium are then added to the mixture, dropwise, with stirring. When adding the sodium metasilicate, the temperature is maintained in a range of 10 to 15° C. The pH is controlled and, if necessary, adjusted between 2.5 and 3.5. The obtained solution has a Si content of 1370 mg/L and a % Si (w/v)/% stabilizer (w/v) ratio of 0.4.

The solution is then sprayed onto 1000 kg of corn and soybean meal and the mixture is homogenized. The poultry feed is fed to chickens over a period of day 1 to day 40 in regular feeding amounts. The chickens exhibited an improved growth rate as of about an additional growth of about 100 grams of weight per day, when compared to a control population of chickens fed without the silicon complex according to the invention. As a further beneficial effect, chicken bone strength was significantly improved.

Example 10

Poultry Feed Comprising Stabilized Complex of Orthosilicic Acid and (( )-2-(3,4-Dihydroxyphenyl) Chroman-3,5,7-Triol)

30.83 g of catechin are dissolved with stirring at 40° C. in 288 ml of 40% ethanol. Osmosis water is then slowly added to the solution, so that the ratio of final volume/volume of introduced precursor is equal to 225, then the pH is adjusted between 1.5 and 2.5 with a solution of phosphoric acid 14.5 N. 96 g of tetraethoxysilane (density: 0.93) are then added to the mixture, dropwise, with stirring. Upon addition of the tetraethoxysilane, the temperature is maintained in a range of 15 to 18° C., The pH is controlled and, if necessary, adjusted between 2.7 and 3.0. The obtained solution has a Si content of 550 mg/L and a % Si (w/v)/% stabilizer (w/v) ratio of 0.4.

The solution is then sprayed onto 1000 kg of corn and soybean meal and the mixture is homogenized. The poultry feed is fed to chickens over a period of day 1 to day 40 in regular feeding amounts. The chickens exhibited an improved growth rate as of about an additional growth of about 100 grams of weight per day, when compared to a control population of chickens fed without the silicon complex according to the invention. As a further beneficial effect, chicken bone strength was significantly improved.

Example 11

Poultry Drinking Water Comprising Stabilized Complex of Orthosilicic Acid and 4-Hydroxy-3-Methoxyhenzaldehyde (Vanillin)

The solution is fed to turkeys. The solution of Example 1 is fed as a drinking water solution to turkeys over a period of day 1 to day 60 in regular feeding amounts. The turkeys exhibited an improved growth rate, when compared to a control population of turkeys fed without the silicon complex according to the invention.

Example 12

Poultry Feed Comprising Stabilized Complex of Orthosilicic Acid and 2-Hydroxybenzoic Acid The solution as obtained in Example 3 is then sprayed onto 1000 kg of corn and soybean meal and the mixture is homogenized. The poultry feed is fed to turkey over a period of day 1 to day 60 in regular feeding amounts. The turkeys exhibited an improved growth rate, when compared to a control population of turkey fed without the silicon complex according to the invention.

It should be understood that the present invention is in no way limited to the embodiments described above and that many modifications may be made thereto within the scope of the appended claims. Similar results can be expected for other types of poultry, also when deviating feeding regimen are applied.

The invention claimed is:

1. A poultry feed or drinking water composition comprising a stable, bioavailable silicon complex formed between silicic acid having free hydroxyl groups and at least one stabilizing agent based on phenol or polyphenol, wherein said composition comprises silicon in an amount of 100 micrograms/kg of composition to 100,000 micrograms/kg of composition as determined by ICP-AES.

2. The poultry feed or drinking water composition according to claim 1, wherein said silicon complex is comprised in drinking water.

3. The poultry feed or drinking water composition according to claim 1, wherein said composition comprises silicon in an amount of 500 micrograms/kg of composition to 2,500 micrograms/kg of composition as determined by ICP-AES.

4. The poultry feed or drinking water composition according to claim 1, wherein said silicic acid is orthosilicic acid having four free hydroxyl groups.

5. The poultry feed or drinking water composition according to claim 1, wherein said stabilizing agent is selected from the group comprising phenolic acids, phenols, aldehyde derivatives of phenolic acids, cinnamic aldehydes, coumarins, naphthoquinones, flavonoids, stilbenes, 4-hydroxy-3-methoxybenzaldehyde, and mixtures of one or more of the aforementioned.

6. The poultry feed or drinking water composition according to claim 1, for improving bone strength in poultry.

7. The poultry feed or drinking water composition according to claim 6, whereby said poultry is chicken and whereby said chicken is between 1 and 40 days of age.

8. A method of breeding poultry by feeding to said poultry a feed or drinking water composition comprising a stable, bioavailable silicon complex formed between silicic acid having free hydroxyl groups and at least one stabilizing agent based on phenol or polyphenol, wherein said composition comprises silicon in an amount of 100 micrograms/kg to 100,000 micrograms/kg of composition as determined by ICP-AES.

9. The method according to claim 8, wherein said silicon complex is comprised in drinking water.

10. The method according to claim 8, wherein said poultry is chicken and wherein said chicken is between 1 and 60 days of age.

11. The method according to claim 8, wherein said silicic acid is orthosilicic acid having four free hydroxyl groups.

12. The method according to claim 8, wherein said stabilizing agent is selected from the group comprising phenolic acids, phenols, aldehyde derivatives of phenolic acids, cinnamic aldehydes, coumarins, naphthoquinones, flavonoids, stilbenes, 4-hydroxy-3-methoxybenzaldehyde, and mixtures of one or more of the aforementioned.

13. The method according to claim 8, wherein said composition comprises silicon in an amount of 500 micrograms/kg to 2,500 micrograms/kg of composition as determined by ICP-AES.

14. The method according to claim 8, wherein said poultry is chicken and wherein said chicken is between 1 and 40 days of age.

15. The poultry feed or drinking water composition according to claim 1, wherein said composition comprises silicon in an amount of 270 micrograms/kg to 1,370 micrograms/kg of composition as determined by ICP-AES.

16. The method according to claim 8, wherein said composition comprises silicon in an amount of 270 micrograms/kg to 1,370 micrograms/kg of composition as determined by ICP-AES.

* * * * *